(12) United States Patent
Takahashi et al.

(10) Patent No.: US 6,562,454 B2
(45) Date of Patent: May 13, 2003

(54) TAG AND LABEL COMPRISING SAME

(75) Inventors: Tomotsugu Takahashi, Chiyoda-ku (JP); Tamio Shikano, Kashima-gun (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 10/000,030

(22) Filed: Dec. 4, 2001

(65) Prior Publication Data
US 2002/0100547 A1 Aug. 1, 2002

(30) Foreign Application Priority Data

Dec. 4, 2000 (JP) ........................................ 2000-368110
Dec. 21, 2000 (JP) ........................................ 2000-389052

(51) Int. Cl.⁷ ............................ B32B 7/12; B42D 15/00
(52) U.S. Cl. .................... 428/354; 428/344; 283/81; 283/83
(58) Field of Search ................... 428/343, 344, 428/354; 283/81, 83

(56) References Cited

U.S. PATENT DOCUMENTS

| | | | | |
|---|---|---|---|---|
| 4,245,035 A | * | 1/1981 | Poshkus ...................... 430/496 |
| 4,457,798 A | * | 7/1984 | Hoppe et al. ................ 156/248 |
| 4,746,392 A | * | 5/1988 | Hoppe ..................... 156/244.12 |
| 4,879,153 A | * | 11/1989 | Ohashi et al. ................. 428/76 |
| 5,026,452 A | * | 6/1991 | Kodai ........................ 156/293 |
| 6,025,054 A | * | 2/2000 | Tiffany, III .................. 428/189 |
| 6,429,831 B2 | * | 8/2002 | Babb ........................... 343/895 |

FOREIGN PATENT DOCUMENTS

| | | |
|---|---|---|
| JP | 11134460 A | 5/1999 |
| JP | 11231782 A | 8/1999 |
| JP | 11277961 A | 10/1999 |
| JP | 11277963 A | 10/1999 |

* cited by examiner

Primary Examiner—Cathy Lam
(74) Attorney, Agent, or Firm—Oblon, Spivak, McClelland, Maier & Neustadt, P.C.

(57) ABSTRACT

An IC tag and label are provided which allow data to be recorded on the surface thereof, are free from security problem that the inner IC circuit or wiring circuit can be seen through, exhibit excellent strength and water resistance, can be used even in the atmosphere and water and can be used for frozen food vessels, industrial products, various chemical vessels, etc. and for flow control, production line control, etc. The IC tag has a laminated structure that includes a thermoplastic resin film layer (A), an adhesive layer (D), and an IC circuit layer (B) or an IC circuit protective layer (C) having a hole containing an IC circuit layer (B). The IC label has a laminated structure that includes a thermoplastic resin film layer (A), an adhesive layer (D), an IC circuit layer (B) or an IC circuit protective layer (C) having a hole containing an IC circuit layer (B), and an adhesive layer (G). An airline tag includes the IC label.

26 Claims, 10 Drawing Sheets

| thermoplastic resin film layer (A) | | |
|---|---|---|
| adhesive layer (D) | | |
| IC circuit protective layer (C) | IC circuit layer (B) | IC circuit protective layer (C) |
| adhesive layer (D) | | |
| thermoplastic resin film layer (A') | | |

FIG. 4

| thermoplastic resin film layer (A) |
|---|
| adhesive layer (D) |
| light shielding layer (E) |
| thermoplastic resin film layer (F) |
| adhesive layer (D) |
| IC circuit layer (B) |
| adhesive layer (D) |
| thermoplastic resin film layer (A') |

FIG. 6

TAG AND LABEL COMPRISING SAME

BACKGROUND OF THE INVENTION

1. Field of the Invention

The present invention relates to an IC (i.e., integrated circuit) tag and label having an IC encapsulated therein which comprises a wiring circuit and an IC circuit for the transmission and reception of data incorporated in its laminated structure and thus can write and read data.

The IC tag and label obtained according to the invention allow data to be recorded on the surface thereof. The IC tag and label of the invention are free from security problem that the inner circuit or wiring circuit can be seen through. The IC tag and label of the invention are excellent in strength and water resistance and thus can be used even in the atmosphere and water, indoor or outdoor. Accordingly, the IC tag and label of the invention can be used for frozen food vessels, industrial products, various chemical vessels, etc. and for flow control, production line control, etc.

2. Discussion of the Background

In recent years, a card comprising an IC module encapsulated therein which performs non-contact transmission/reception of data via external reader and writer has spread. An IC tag or label having an adhesive layer which is applied to the adherend for use has been proposed for the same purpose. For example, Japanese Patent Laid-Open No. 1999-277961, Japanese Patent Laid-Open No. 1999-277963, Japanese Patent Laid-Open No. 1999-134460 and Japanese Patent Laid-Open No. 1999-231782 disclose the structure and usage of IC tag and label.

SUMMARY OF THE INVENTION

It is therefore an object of the invention to provide an IC tag or label which realizes data recording properties, security, strength and water resistance such that the purpose of IC tag or label disclosed in the above cited patents can be further expanded.

The foregoing object of the present invention will become apparent from the following detailed description and examples.

In accordance with the present invention, a specific laminated structure is defined and the properties of the surface thermoplastic resin film to be used is defined. Accordingly, the IC tag or label of the invention can be externally viewed as a mere conventional paper adhesive label or paper tag without any sense of incompatibility though having an IC circuit layer comprising an IC circuit and a wiring circuit incorporated therein or thereon and excellent strength and water resistance.

The present invention provides an IC tag having a laminated structure comprising a thermoplastic resin film layer (A), an adhesive layer (D), and an IC circuit layer (B) or an IC circuit protective layer (C) having a hole containing an IC circuit layer (B); an IC label having a laminated structure comprising a thermoplastic resin film layer (A), an adhesive layer (D), an IC circuit layer (B) or an IC circuit protective layer (C) having a hole containing an IC circuit layer (B), and an adhesive layer (G); and an airline tag comprising the IC label.

In a preferred embodiment of the IC tag and label according to the invention, a light shielding layer (E) is preferably provided interposed between the thermoplastic resin film layer (A) and the IC circuit layer (B). Further, a thermoplastic resin film layer (F) and an adhesive layer (D) are preferably provided interposed between the light shielding layer (E) and the IC circuit layer (B).

The IC circuit layer (B) has a smaller size than the IC tag and label and a thickness less than or equal to the thickness of the IC circuit protective layer (C). An adhesive layer (D) is preferably provided interposed between the thermoplastic resin film layer (A) and the IC circuit protective layer (C). A light shielding layer (E) is preferably provided interposed between the thermoplastic resin film layer (A) and the IC circuit protective layer (C). Further, and adhesive layer (D) and a thermoplastic resin film layer (F) having a light shielding layer (E) provided on at least one surface thereof are preferably provided interposed between the thermoplastic resin film layer (A) and the adhesive layer (D).

The IC tag and label preferably exhibit a whiteness degree of not smaller than 85% and a total light transmittance of nut greater than 15%.

The thermoplastic resin film layer (A) preferably exhibits an opacity of not smaller than 80% and a whiteness degree of not smaller than 90%.

The thermoplastic resin film layer (A) preferably exhibits a porosity of from 10% to 60% as calculated by the following equation:

$$\% \text{ Porosity} = \{(\rho_0 - \rho)/\rho_0\} \times 100 \quad (1)$$

where $\rho_0$ represents the true density of the film; and $\rho$ represents the density of the film.

The thermoplastic resin to be used in the thermoplastic resin film layer (A) and the thermoplastic resin film layer (F) is preferably a polyolefin resin and/or polyester resin, and the polyolefin resin is preferably a propylene resin. Further, the thermoplastic resin film layer (A) preferably has a recording layer provided on the surface thereof.

BRIEF DESCRIPTION OF THE DRAWINGS

The preferred embodiments of the invention will be described in detail, with reference to the following figures, wherein:

FIG. 4 shows a laminated tag according to the invention.
FIG. 6 shows a laminated tag according to the invention.

DETAILED DESCRIPTION OF THE INVENTION

Figure 1:
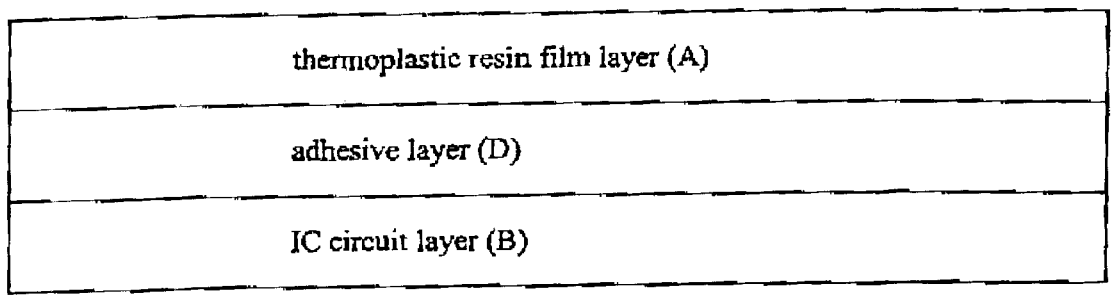
FIG. 1 shows a laminated tag according to the invention.
Figure 2:
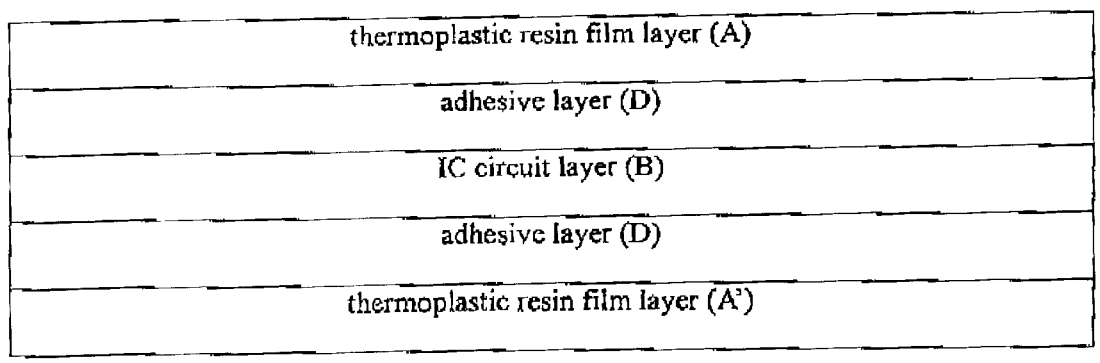
FIG. 2 shows a laminated tag according to the invention.

The present invention will be further described hereinafter.

The various layers of the invention will be, further described hereinafter.

(1) Thermoplastic resin film layer (A)

The thermoplastic resin film layer (A) of the invention comprises a thermoplastic resin, and an inorganic particulate material and/or organic filler.

Examples of the thermoplastic resin employable herein include ethylene resins such as high density polyethylene, middle density polyethylene and low density polyethylene, propylene resins, polyolefin resins such as polymethyl-1- pentene and ethylene-cyclic olefin copolymer, polyamide resins such as nylon-6, nylon-6,6-nylon 6 and nylon-6,12, thermoplastic polyester resins such as polyethylene terephthalate, copolymer thereof, polyethylene naphthalate and aliphatic polyester, and thermoplastic resins such as polycarbonate, atactic polystyrene, synadiotactic polystyrene and polyphenylene sulfide. Two or more of these thermoplastic resins may be used in admixture.

Preferred among these thermoplastic resins are polyolefin resins. Preferred among these polyolefin resins are propylene resin and high density polyethylene from the standpoint of cost, water resistance and chemical resistance.

As such a propylene resin there may be used a copolymer mainly comprising a polypropylene or propylene having an isotacticity or syndiotacticity and a stereoregularity of various degrees as a propylene homopolymer with α-olefin. This copolymer may be binary, ternary or quaternary or may be a random copolymer or block copolymer.

As the inorganic particulate material there may be used one having a particle diameter of normally from 0.01 to 15 μm, preferably from 0.02 to 8 μm, more preferably from 0.03 to 4 μm. In some detail, powdered calcium carbonate, calcined clay, silica, diatomaceous earth, talc titanium oxide, barium sulfate, alumina or the like may be used.

As the organic filler there is preferably selected a resin of kind different from that of the thermoplastic resin which is a main component. For example, if the thermoplastic resin film is a polyolefin resin film, the organic filler to be used herein may be a polyethylene terephthalate polybutylene terephthalate, polycarbonate, nylon-6, nylon-6,6, cyclic olefin, copolymer of cyclic olefin homopolymer or cyclic olefin with ethylene or the like having a melting point of from 120° C. to 300° C. or a glass transition temperature of from 120° C. to 280° C.

The thermoplastic resin film layer (A) may further comprise a stabilizer, a light-stabilizer, a dispersant, a lubricant or the like incorporated therein as necessary. As the stabilizer there may be incorporated a steric hindrance-causing phenol-based, phosphor-based or amine-based stabilizer in an amount of from 0.001 to 1% by weight. As the light-stabilizer there may be incorporated a steric hindrance-causing amine or benzotriazole-based or benzophenone-based light-stabilizer in an amount of from 0.001 to 1% by weight. As the dispersant there may be incorporated an inorganic particulate material such as silane coupling agent, higher aliphatic acid such as oleic acid and stearic acid, metallic soap, polyacrylic acid, polymethacrylic acid or salt thereof in an amount of from 0.01 to 4% by weight.

The thermoplastic resin film constituting the thermoplastic resin film layer (A) of the invention may be a single layer, a two-layer laminate comprising a base layer and a surface layer, a three-layer laminate comprising a surface layer provided on both surfaces of a base layer or a multi-layer laminate comprising other resin film layer provided interposed between a base layer and a surface layer. The thermoplastic resin film may be oriented at least monoaxially. Referring to the number of axes along the multi-layer laminate is oriented, the two-layer laminate may have a laminate of two monoaxially oriented layers, a laminate of a monoaxially oriented layer and a biaxially oriented layer or a laminate of a biaxially oriented layer and a monoaxially oriented layer. The three-layer laminate may have a laminate of a monoaxially oriented layer, a monoaxially oriented layer and a biaxially oriented layer, a laminate of a monoaxially oriented layer, a biaxially oriented layer and a monoaxially oriented layer, a laminate of a biaxially oriented layer, a monoaxially oriented layer and a monoaxially oriented layer, a laminate of a monoaxially oriented layer, a biaxially oriented layer and a biaxially oriented layer, a laminate of a biaxially oriented layer, a biaxially oriented layer and a monoaxially oriented layer, or a laminate of three biaxially oriented layers. In the case of a laminate of four or more layers, the number of axes of orientation may be arbitrarily combined.

In the case where the thermoplastic resin film layer (A) is a single polyolefin resin film layer containing an inorganic particulate material and/or organic filler, it normally comprises a polyolefin resin and an inorganic particulate material and/or organic filler incorporated therein in an amount of from 40 to 99.5% by weight and from 0.5% to 60% by weight, preferably from 50 to 97% by weight and from 3 to 50% by weight, respectively.

In the case where the thermoplastic resin film has a multi-layer structure comprising a base layer and a surface layer containing an inorganic particulate material and/or organic filler, the base layer comprises a polyolefin resin and an inorganic particulate material and/or organic filler incorporated therein in an amount of from 40 to 99.5% by weight and from 0.5 to 60% by weight, preferably from 50 to 97% by weight and from 3 to 50% by weight, respectively, and the surface layer comprises a polyolefin resin and an inorganic particulate material and/or organic filler incorporated therein in an amount of from 25 to 100% by weight and from 0 to 75% by weight, preferably from 30 to 97% by weight and from 3 to 70% by weight, respectively.

When the content of inorganic particulate material and/or organic filler in the base layer of the single-layer structure or multi-layer structure exceeds 60% by weight, the resin film which has been longitudinally oriented is subject to break during the subsequent crosswise orientation. When the content of inorganic particulate material and/or organic filler in the surface layer exceeds 75% by weight, the resin film which has been oriented has a low strength at the surface layer and thus is subject to break on the surface layer due to mechanical impact during use.

{Formation of Resin Film}

The process for the formation of the thermoplastic resin film layers (A) and (F) is not specifically limited. Various known processes may be employed. Specific examples of formation process employable herein include cast molding process which comprises extruding a molten resin through a single-layer or multi-layer T die or I die connected to a screw extruder into a sheet, calendering process, rolling process, inflation process, process involving the removal of solvent or oil from casted or calendered mixture of thermoplastic resin ad organic solvent or oil, and process involving the formation of thermoplastic resin and removal of solvent therefrom.

The rolling of the thermoplastic resin can be carried out by various known processes. Specific examples of these processes include longitudinal orientation utilizing the difference in peripheral speed between rolls, and crosswise orientation using a tenter oven.

{Orientation}

The orientation of the thermoplastic resin can be carried out by various known processes. In some detail, the thermoplastic resin can be oriented at a temperature of not lower than the glass transition point thereof if it is an amorphous resin or at a known temperature range appropriate for thermoplastic resin from not lower than the glass transition point thereof to not higher than the melting point thereof if it is a crystalline resin. Specific examples of these processes include longitudinal orientation utilizing the difference in peripheral speed between rolls, crosswise orientation using a tenter oven, rolling, and simultaneous biaxial orientation using a combination of tenter oven and linear motor.

The draw ratio is not specifically limited but may be properly predetermined according to the purpose and the properties of the thermoplastic resin used. By way of example, the thermoplastic resin, if it is a propylene homopolymer or copolymer thereof, is monoaxially oriented at a draw ratio of from about 1.2 to 12, preferably from about 2 to 10, or biaxially oriented at an area ratio of from 1.5 to 60, preferably fare 10 to 50. The thermoplastic resin, if it is other thermoplastic resin, is monoaxially oriented at a draw ratio of from about 1.2 to 10, preferably from about 2 to 5, or biaxially oriented at an area ratio of from 1.5 to 20, preferably from 4 to 12. Further, the thermoplastic resin is subjected to heat treatment at high temperature as necessary.

The orientation temperature is 2° C. to 150° C. lower than the melting point of the thermoplastic resin. In some detail, when the thermoplastic resin is a propylene homopolymer (melting point: 155° C. to 167° C.), the orientation temperature is from 152° C. to 164° C. When the thermoplastic resin is a high density polyethylene (melting point: 121° C. to 134° C.), the orientation temperature is from 110° C. to 120° C. When the thermoplastic resin is a polyethylene terephthalate (melting point: 246° C. to 252° C.), the orientation temperature is from 104° C. to 115° C.

The orientation speed is from 20 to 350 m/min.

The thermoplastic resin film, if it comprises an inorganic particulate material or organic filler incorporated therein, is subject to occurrence of fine cracks on the surface thereof and micro voids in the interior thereof.

The thickness of the thermoplastic resin film thus oriented is from 20 $\mu$m to 350 $\mu$m, preferably from 35 $\mu$m to 300 $\mu$m.

(Physical Properties of Oriented Film)

Referring to the physical properties of the thermoplastic resin film layer (A) of the invention thus oriented, the thermoplastic resin film layer (A) exhibits an opacity of from 80% to 100%, preferably from 85% to 100% according to JIS P8138, and a whiteness degree of from 90% to 100%, preferably from 95% to 100% according to JIS L1015.

When the opacity of the thermoplastic resin film layer (A) deviates from the above defined range, the inner IC circuit layer (B) can be seen through or the color of the light shielding layer (E) can be seen through to disadvantage. Further, when the whiteness degree of the thermoplastic resin film layer (A) deviates from the above defined range, letter and image data recorded on the surface of the IC tag or label are recognized blurred and undesirable external appearance is given.

The thermoplastic resin film layer (A) exhibits a porosity of from 10% to 60%, preferably from 10% to 35%, more preferably from 15% to 25% as calculated by the following equation. When the porosity of the thermoplastic resin film layer (A) falls below 10%, the reduction of the weight of the laminate can be difficultly accomplished. On the contrary, when the porosity of the thermoplastic resin film layer (A) exceeds 60%, there can easily occur difficulty in the tag strength and the label strength.

$$\% \text{ Porosity} = \{(\rho_0 - \rho)/\rho_0\} \times 100 \qquad (I)$$

where $\rho_0$ represents the true density of the film; and $\rho$ represents the density of the film (according to JIS P-8118). The true density of the film is almost equal to the density of the unoriented film unless the unoriented material contains a large amount of air.

{Formation of Modified Surface Layer}

In order to prevent the electrification of the thermoplastic resin film constituting the thermoplastic, resin film layer (A) and improve various printability properties thereof, the thermoplastic resin film is subjected to surface treatment at least on the surface thereof to form a modified surface layer thereon.

The surface treatment process involves a predetermined surface oxidation with a predetermined surface treatments.

As the surface oxidation process there may be used corona discharge treatment, flame treatment, plasma treatment, glow discharge treatment and ozone treatment, which are commonly used for the treatment of film, singly or in combination. Preferred among these treatment processes are corona discharge treatment and flame treatment. The amount of treatment, if corona discharge treatment is effected, is from 600 to 12,000 J/m$^2$ (10 to 200 W.min/m$^2$), preferably from 1,200 to 9,000 J/m$^2$ (20 to 180 W.min/m$^2$), or, if flame treatment is effected, is from 8,000 to 200,000 J/m$^2$, preferably from 20,000 to 100,000 J/m$^2$.

{Surface Treatment}

As the foregoing surface treatment there is mainly selected from the following primers and antistatic polymers. These primers and antistatic polymers may be used singly or in admixture of two or more thereof. From the standpoint of improvement of adhesivity during dry lamination and prevent electrification, a primer is preferably used optionally in combination with an antistatic polymer as such a surface treatment.

(i) Primer

Examples of the primer employable herein include polyethyleneimine polymers such as $C_1$–$C_{12}$ alkyl-modified polyethyleneimine, poly(ethyleneimine-urea), ethyleneimine adduct of polyaminamide and epichlorohydrin adduct of polyaminepolyamide, acrylic acid ester polymers such as acrylic acid amide-acrylic acid ester copolymer, acrylic acid amide-acrylic acid ester-methacrylic acid ester copolymer, polyacrylamide derivative, oxazoline group-containing acrylic acid ester polymer and polyacrylic acid ester, water-soluble resins such as polyvinylpyrrolidone, polyethylene glycol, polyvinyl alcohol and resin, and water-dispersible resins such as polyvinyl acetate, polyurethane, ethylene-vinyl acetate copolymer, polyvinylidene chloride, chlorinated polypropylene and acrylonitrile-butadiene copolymer.

Preferred among these primers are polyetyleneimine copolymer, urethane resin, and polyacrylic acid ester, particularly polyethyleneimine copolymer. Even more preferably, an ethyleneimine adduct of polyethyleneimine or polyaminepolyamide having a polymerization degree of from 20 to 3,000, optionally modified with a $C_1$–$C_{24}$ halogenated alkyl, halogenated alkenyl, halogenated cycloalkyl or halogenated benzyl group, is used.

(ii) Antistatic Polymer

As the antistatic polymer there may be used a cationic, anionic or amphoteric polymer. Examples of the cationic polymer include polymers having a quaternary ammonium salt or phosphonium salt structure, nitrogen-containing acrylic polymers, and acrylic or methacrylic polymers having a quaternary ammonium salt structure. Examples of the anionic polymer include styrene-maleic anhydride copolymer or alkaline metal salt thereof, alkaline metal salt of ethylene-acrylic acid copolymer, and alkaline metal salt of ethylene-methacrylic acid copolymer. Examples of the amphoteric polymer include acrylic or methacrylic polymers having a betaine-structured nitrogen. Particularly preferred among these antistatic polymers are acrylic or methacrylic polymers having a quaternary ammonium sat-structured nitrogen.

The molecular weight of the antistatic polymer may be of arbitrary order according to polymerization conditions such as polymerization temperature, type and amount of polymerization initiator, amount of solvent to be used and kind of chain transfer agent used. In general, the molecular weight of the polymer thus obtained is from 1,000 to 1,000,000, preferably from 1,000 to 500,000.

The foregoing surface treatment of the invention may contain the following arbitrary ingredients as necessary.

(iii) Arbitrary Ingredient 1: Crosslinking Agent

The incorporation of a crosslinking agent makes it possible to further improve the strength or water resistance of the oat layer. Examples of the crosslinking agent employable herein include epoxy compounds such as glycidyl ether and glycidyl ester, and water-dispersible resins such as epoxy resins, isocyanate resin, oxazoline resin, formaline resin and hydrazide resin. The amount of the crosslinking agent to be added is normally not greater than 100 parts by weight based on 100 parts by weight of effective component obtained by excluding the foregoing solvent for surface modifier.

(iv) Arbitrary Ingredient 2: Alkaline Metal Salt or Alkaline Earth Metal Salt

The surface modifier comprises an alkaline metal salt or alkaline earth metal salt incorporated therein. Examples of these salts include water-soluble inorganic salts such as sodium carbonate, sodium hydrogencarbonate, potassium carbonate, sodium sulfite, other alkaline salts, sodium chloride, sodium sulfate, sodium nitrate, sodium tripolyphosphate, sodium pyrophosphate and ammonium alum. The amount of the arbitrary ingredient is normally not greater than 50 parts by weight based on 100 parts by weight of effective component obtained by excluding the foregoing solvent for surface modifier.

(v) Arbitrary Ingredient 3

The surface modifier may further comprise a surface active agent, an antifoaming agent, a water-soluble or water-dispersible finely divided material or other auxiliaries incorporated therein. The amount of the arbitrary ingredient to be used is normally not greater than 20 parts by weight based on 100 parts by weight of effective component obtained by excluding the foregoing solvent for surface modifier.

{Formation of Surface-Treated Layer}

The various ingredients of the foregoing surface-treated layer are dissolved in water or a hydrophilic solvent such as methyl alcohol, ethyl alcohol and isopropyl alcohol before use. In particular, these ingredients are normally used in the form of aqueous solution. The concentration of the solution is normally from about 0.1 to 20% by weight, preferably from about 0.1 to 10% by weight.

The application of these ingredients may be conducted by means of roll coater, blade coater, bar coater, air knife coater size press coater, gravure coater, reverse coater, die coater, lip coater, spray coater or the like. If necessary, the coated material is smoothed or dried to remove extra water or hydrophilic solvent therefrom.

The coated amount of these ingredients is from 0.005 to 5 g/m$^2$, preferably from 0.1 to 2 g/m$^2$ as calculated in terms of solid content.

In the case where the thermoplastic resin film constituting the thermoplastic resin film layer (A) is an oriented film, the application of the surface-treated layer may be effected in one stage or multiple stages regardless of which it is effected before or after longitudinal or crosswise orientation If necessary, a writability-providing layer, print quality improving layer, heat transfer receiving layer, heat-sensitive recording layer, ink jet receiving layer or the like may be provided on the surface of the thermoplastic resin film layer (A) by the same coating process as in the formation of the surface-treated layer after the foregoing surface treatment or the formation of surface-treated layer.

As shown in FIGS. 1–4, the thermoplastic resin film layer (A) may be laminated on one or both surfaces of the IC circuit layer (B) or the IC circuit protective layer (C). In the case where the thermoplastic resin film layer (A) is laminated on both surfaces of the IC circuit layer (B) or the IC circuit protective layer (C), the same thermoplastic resin film layer (A) may be used for both surfaces of the IC circuit layer (B) or IC circuit protective layer (C) (e.g., A/../B/../A) or different thermoplastic resin film layers (A), (A') may be used for the respective side of the IC circuit layer (B) or IC circuit protective layer (C) (e.g., A/../B../A'). The opacity of the thermoplastic resin film layer (A') is not specifically limited. The thermoplastic resin film layer (A') may be transparent or opaque.

(2) IC Circuit Layer (B)

The IC circuit layer (B) of the invention is preferably arranged such that it cannot be totally viewed on the surface or side face of the IC tag and label. To this end, the IC circuit layer (B) preferably has a smaller surface area than that of IC tag and label and a thickness of not greater than that of the IC circuit protective layer (C) as viewed on the side face thereof.

The IC circuit layer (B) of the invention may be brought into direct contact with the adhesive layer (G).

The IC circuit layer (B) is provided by forming an IC circuit and a wiring circuit on a circuit board. The IC circuit and an antenna circuit are electrically connected to each other.

As the substrate material for the circuit board there may be used a commonly used rigid type substrate material such as paper phenol, glass epoxy and composite, flexible type substrate material such as polyimide film and polyester film or composite thereof.

Examples of the wiring circuit employable herein include wiring circuit obtained by a process which comprises providing a coiled metallic conductor on the substrate material with an adhesive or beating and pressing a coiled metallic conductor onto the substrate film so that the substrate film is deformed, wiring circuit obtained by a process which comprises etching the metallic area of a substrate material clad with copper or aluminum, wiring circuit obtained by a process which comprises transferring a foil of an electrically-conductive metal such as silver, and wiring circuit obtained by a process which comprises silk-screening an electrically-conductive paste coating compound on a substrate, and then drying the coated substrate.

The IC circuit layer (B) is formed by mounting an IC circuit on a substrate having the foregoing wiring circuit formed thereon, and then electrically connecting the antenna circuit to the IC circuit.

The mounting of the IC circuit on the substrate can be carried out by TAB (tape automated bonding), COB (chip on board) or flip chip mounting.

For the mounting of the IC circuit or the connection of the IC circuit to the antenna circuit, ordinary soldering or electrically-conductive adhesive may be employed. It is necessary that working be effected under temperature conditions where the circuit board material can withstand.

The IC circuit (B) may be packaged by an epoxy resin or the like to protect mounted IC circuit or wiring circuit.

The IC circuit (B) preferably has a thickness of 150 μm to 1 mm after the packaging with the epoxy resin.

(3) IC Circuit Protective Layer (C)

As the IC circuit protective layer (C) to be used in the invention there may be used an ordinary oriented or unoriented thermoplastic resin film besides the same film as used in the thermoplastic resin film layer (A). However, when the IC circuit layer (B) is not packaged, the IC circuit protective layer (C) preferably exhibits a vertical electrical resistivity of not smaller than $10^8$ Ω, more preferably not smaller than $10^{10}$ Ω because there must occur no electrical conduction between the IC circuit layer (B) and the IC circuit protective layer (C). The IC circuit protective layer (C) preferably exhibits a surface electrical resisitivity of not smaller than $10^8$ Ω, more preferably not smaller than $10^9$ Ω on the side thereof in contact with the IC circuit board layer.

Figure 3:
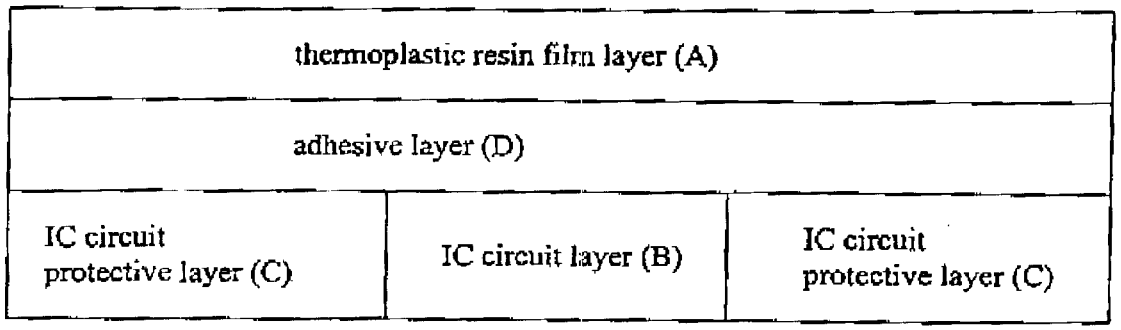
FIG. 3 shows a laminated tag according to the invention.

In order to protect the IC circuit layer (B), as shown in FIGS. 3 and 4 the IC circuit protective layer (C) has a through-hole punched therein which is big enough to receive the IC circuit layer (B) as viewed from above. In order to form this through-hole, a cutting die for cutting paper, film, metal plate or the like can be used. The cutting shape may be arbitrarily changed according to the shape of the IC circuit layer (B) as viewed from above.

In order to protect the IC circuit layer (B) and eliminate unevenness on both surfaces of the IC tag and label, the thickness of the IC circuit protective layer (C) is preferably greater than that of the IC circuit layer (B). On the other hand, in order to prevent undesirable movement of the IC circuit board layer in the IC tag and label, the thickness of the IC circuit protective layer (C) is preferably 0 to 100 µm, preferably 0 to 50 µm greater than that of the IC circuit layer (B).

(4) Thermoplastic Resin Film Layer (F)

As the thermoplastic resin film layer (F) to be used in the invention there may be used an ordinary oriented or unoriented thermoplastic resin film besides the same film as used in the thermoplastic resin film layer (A). However, the thermoplastic resin film layer (F) preferably exhibits a vertical electrical resistivity of not smaller than $10^8$ Ω, more preferably not smaller than $10^{10}$ Ω because there must occur no electrical conduction in the IC circuit layer (B). The thermoplastic resin film layer (F) preferably exhibits a surface electrical resistivity of not smaller than $10^8$ Ω, more preferably not smaller than $10^9$ Ω on the side thereof in contact with the IC circuit board layer. The thickness of the thermoplastic resin film layer (F) is from 5 µm to 300 µm, preferably from 10 µm to 150 µm.

(5) Light Shielding Layer (E)

Figure 5:
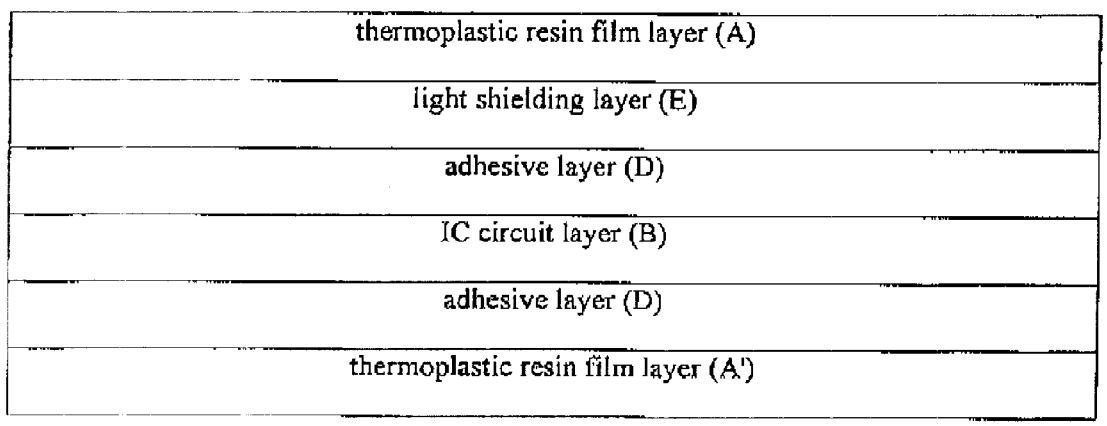
FIG. 5 shows a laminated tag according to the invention.

The light shielding layer (E) formed interposed between the thermoplastic resin film layer (A) and the IC circuit layer (B), as shown in FIG. 5, or between the thermoplastic resin film layer (A) and the thermoplastic resin film layer (F), as shown in FIG. 6, is a layer having the smallest visible light transmittance per unit thickness in all the layers constituting the invention, i.e., light transmittance of not greater than 0.5% in the wavelength range of from 380 nm to 780 nm.

The light shielding layer (E) is formed, e.g., by a process which comprises making black solid offset or gravure printing on one surface of the thermoplastic resin film layer (A) or (F), a process which comprises stamping an aluminum vacuum-deposited foil, transfer-depositing aluminum or directly vacuum-depositing aluminum, or a process which comprises laminating the thermoplastic resin film layers (A) and (F) with an adhesive containing a large amount of a black filter such as carbon black or a white filler such as titanium oxide whisker and particulate titanium oxide.

(6) Adhesive Layer (D)

As the adhesive layer (D) there may be used one which maintains its adhesivity during lamination at the step of producing the IC tag and label. In general, an adhesive layer which can be contact-bonded to the adherend at ordinary temperature or under heating may be used. The same strongly adhesive type of material as the adhesive layer (G) described later or an ordinary heat sealer may be used.

As the adhesive there may be used a liquid anchor coat, e.g., polyurethane anchor coat such as EL-150 (trade name) and mixture of BLS-2080A and BLS-2080B (produced by Toyo-Morton, Ltd.) or polyester anchor coat such as AD-503 (trade name) (produced by Toyo-Morton, Ltd.). The anchor coat may be applied in a weighed quantity of from 0.5 to 25 g/m².

(7) Adhesive Layer (G)

The kind and thickness (coated amount) of the adhesive layer (G) can be arbitrarily predetermined according to the kind of the adherend, the environmental conditions under which the product is used, the strength of the adhesive, etc.

The adhesive layer (G) can be formed by applying and drying a commonly used aqueous or solvent-based adhesive. Examples of such an adhesive employable herein include natural rubber-based adhesive, synthetic rubber-based adhesive, and acrylic adhesive. These synthetic polymer adhesives may be used in the form of dispersion in an organic solvent or aqueous dispersion or emulsion.

In order to improve the shielding properties of the label, the adhesive to be used in the invention may comprise a pigment such as titanium white incorporated therein.

{Formation of Adhesive Layer}

The adhesive layer (G) is formed by applying the adhesive in the form of solution to the silicon-treated surface of a release paper. The application of the adhesive may be conducted by means of roll coater, blade coater, bar coater, air knife coater, gravure coater, reverse coater, die coater, lip coater, spray coater or the like. If necessary, the coated material is smoothed or dried before the formation of the adhesive layer (G).

Figure 7:
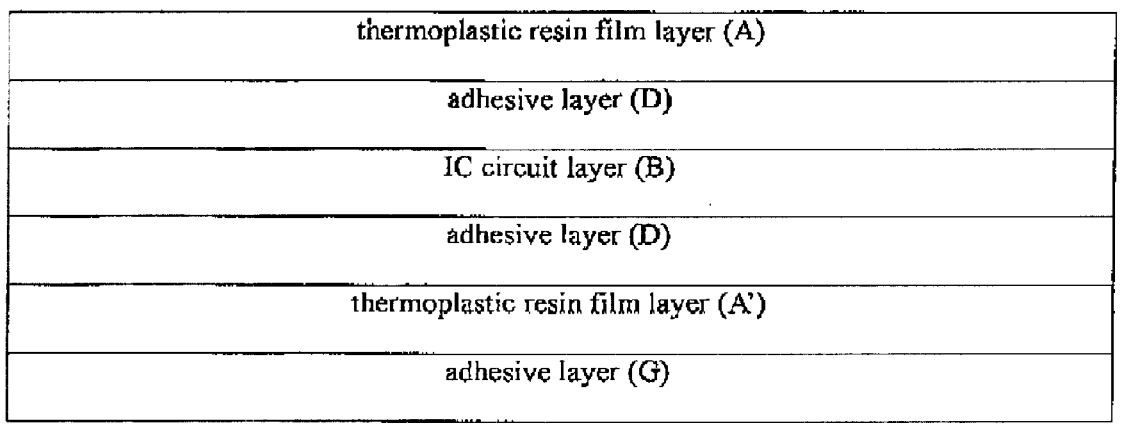
FIG. 7 shows a laminated label according to the invention.
Figure 8:
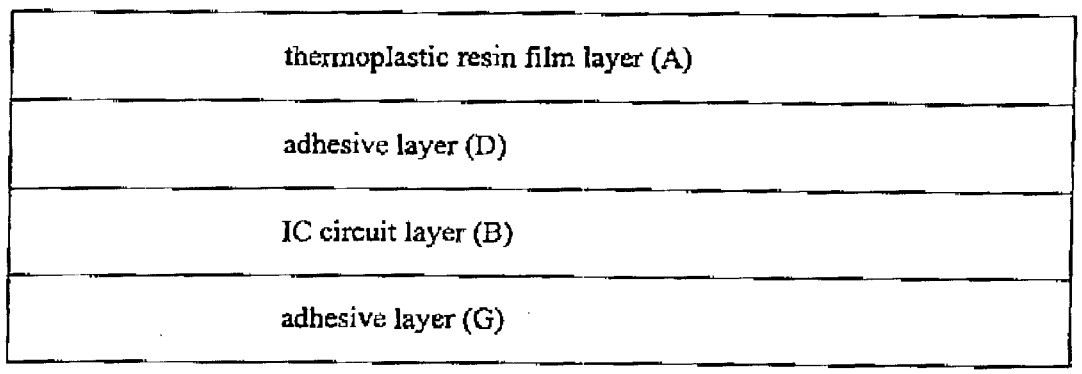
FIG. 8 shows a laminated label according to the invention.
Figure 9:
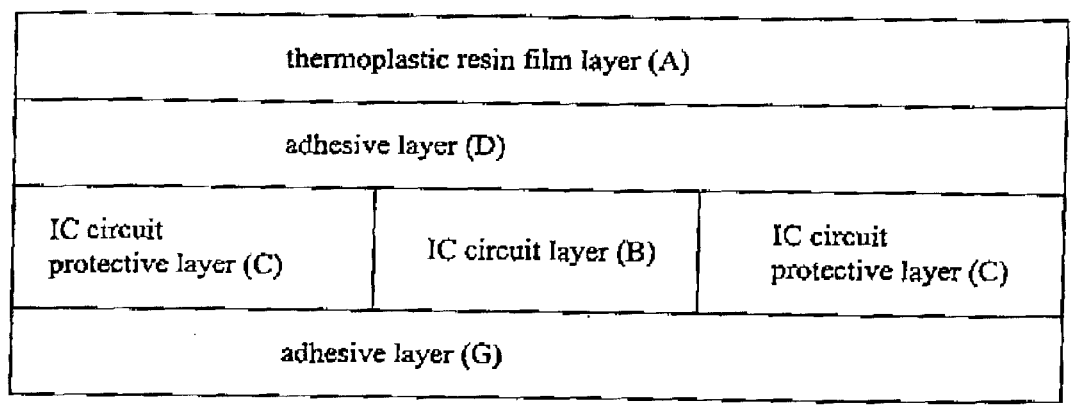
FIG. 9 shows a laminated label according to the invention.

As shown in FIGS. 7, 8 and 9, in some cases, the adhesive may be directly applied to the thermoplastic resin film layer (A), the IC circuit layer (B) or the IC circuit protective layer (C) to form the adhesive layer (G).

The thickness of the adhesive layer (G) may be arbitrarily predetermined according to the purpose of the label but is normally from 2 µm to 30 µm, preferably from 5 µm to 20 µm.

(8) Release Paper

The release paper to be provided with the adhesive layer (G) interposed between the thermoplastic resin film layer (A), the IC circuit layer (B) or the IC circuit protective layer (C) and the release paper is normally subjected to silicon treatment on the surface thereof in contact with the adhesive layer (G) to improve its peelability from the adhesive layer (G) before the application of the label paper to the object.

As the release paper there may be used an ordinary product. A high quality paper or kraft paper may be used as it is or may be calendered, coated with a resin or laminated with a film before use. Alternatively, a silicon-treated glassine paper, coated paper or plastic film may be used.

(9) Printing

Figure 10:
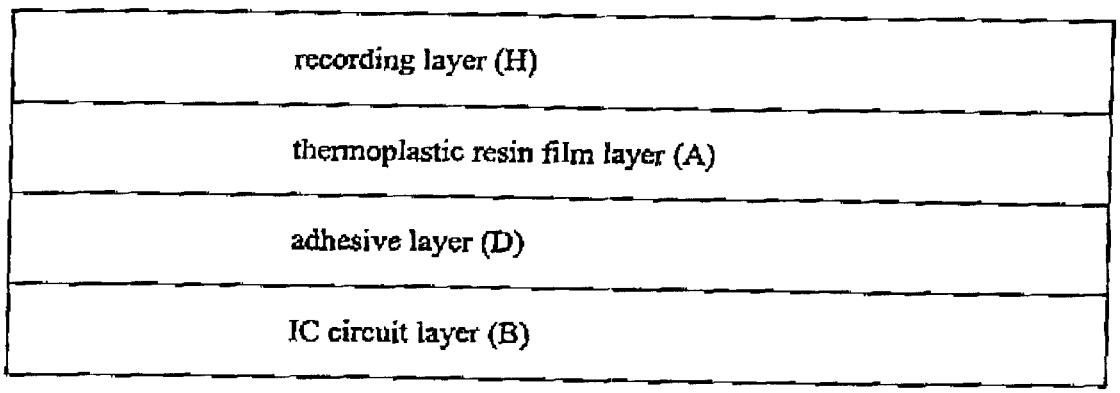
FIG. 10 shows a laminated tag according to the invention.

The tag and label thus obtained may be provided with a print or recording layer (H) as shown in FIG. 10 so that it is applied to printing such as letterpress printing, gravure printing, flexographic printing, solvent type offset printing, ultraviolet-curing offset printing and rotary press printing involving the use of sheet or roll press, not to mention using electrophotographic process, sublimation heat transfer process, melt heat transfer process, direct thermal process, rewritable marking process and ink jet printing process.

(10) Airline Tag

The release paper is peeled off the IC label thus obtained. Two sheets of the IC labels may be bonded to each other to form a product which can be used as an airline tag.

{Physical Properties of IC Tag and Label}

The IC tag and label of the invention need to meet the following requirements.

Whiteness Degree

The IC tag and label of the invention free of release paper exhibits a whiteness degree of not smaller than 85%, preferably from 90% to 100% on the print surface thereof (according to JIS L1015). When the whiteness degree of the IC tag and label falls below 85%, letter and image data recorded on the surface of the IC tag or label are recognized blurred and undesirable external appearance is given.

Total Light Transmittance

The IC tag and label of the invention free of release paper exhibits a total light transmittance at wavelength of from 380 nm to 780 nm of not greater than 15%, preferably from 0% to 13% on the print surface thereof (according to JIS K7105). When the total light transmittance of the IC tag and label exceeds 15%, the inner IC circuit layer (B) can be seen through or the color of the light shielding layer (E) optionally provided can be seen through to disadvantage.

Thickness

The IC tag and label of the invention free of release paper has a thickness of from 150 μm to 2 mm, preferably 200 μm to 1 mm, even more preferably from 250 μm to 800 μm. When the thickness of the IC tag and label falls below 150 μm, the strength of the IC tag and label is insufficient, making the inner IC circuit layer (B) subject to destruction. On the contrary, when the thickness of the IC tag and label exceeds 2 mm, the resulting tag and label is too rigid to handle.

The present invention will be further described in the following examples, but the present invention should not be construed as being limited thereto. The thermoplastic resin and inorganic particulate materials used herein are set forth in Table 1.

temperature of 150° C., and then longitudinally oriented by a factor of 5 to obtain a five-fold longitudinally oriented film.

A composition A2 obtained by mixing 54% by weight of a propylene homopolymer b and 46% by weight of calcium carbonate was kneaded in another extruder at a temperature of 210° C., and then extruded through a die into a sheet which was then laminated on both surfaces of the five-fold longitudinally oriented film obtained above to obtain a three-layer laminated film.

Subsequently, the three-layer laminated film was cooled to a temperature of 60° C., heated again to a temperature of about 155° C., crosswise oriented by a factor of 7.5 using a tenter, annealed at a temperature of 165° C., cooled to a temperature of 60° C., and then slit at the edge thereof to obtain a three-layer (monoaxially oriented layer/biaxially oriented layer/monoaxially oriented layer) laminated thermoplastic resin film having a thickness of 60 μm (A2/A1/A2=10 μm/40 μm/10 μm), a whiteness degree of 96%, an opacity of 87%, a porosity of 32% and a density of 0.79 g/cm$^3$.

Preparation Example 2

A composition A1 obtained by mixing 65% by weight of a propylene homopolymer a, 10% by weight of a high density polyethylene and 25% by weight of calcium carbonate, a composition A2 obtained by mixing 99% by weight of a propylene homopolymer b and 1% by weight of titanium dioxide and a composition A3 comprising 100% by weight of a propylene homopolymer b were melt-kneaded in three separate extruders at a temperature of 250° C.

Thereafter, the three compositions thus melt-kneaded were supplied into a co-extrusion die where they were laminated (A2/A1/A3) and then extruded into a sheet which

TABLE 1

| Kind | Contents |
| --- | --- |
| Propylene homopolymer a | Propylene homopolymer [produced by Japan Polychem Co., Ltd.; Novatech PP:EA8] (MFR (230° C., 2.16 kg load) = 0.8 g/10 min. |
| Propylene homopolymer b | Propylene homopolymer [produced by Japan Polychem Co., Ltd.; Novatech PP:MA4] (MFR (230° C., 2.16 kg load) = 5 g/10 min. |
| Propylene homopolymer c | Propylene homopolymer [produced by Japan Polychem Co., Ltd.; Novatech PP:FY6C] (MFR (230° C., 2.16 kg load) = 2.4 g/10 min. |
| High density polyethylene | High density polyethylene [produced by Japan Polychem Co., Ltd.; Novatech HD:HJ360] (MFR (190° C., 2.16 kg load) = 5.5 g/10 min. |
| Calcium carbonate | Heavy calcium carbonate having an average particle diameter of 1.25 μm [produced by Bihoku Funka Kogyo K.K.; Softon 1800] |
| Titanium dioxide | Titanium dioxide having an average particle diameter of 0.2 μm [produced by ISHIHARA SANGYO KAISHA, LTD.; CR60] |

{I} Preparation of Thermoplastic Resin Film (A)

Preparation Example 1

A composition A1 obtained by mixing 81% by weight of a propylene homopolymer a, 3% by weight of a high density polyethylene and 16% by weight of calcium carbonate was kneaded in an extruder the temperature of which had been adjusted to 270° C., and then extruded into a sheet which was then cooled in a cooling apparatus to obtain an unoriented sheet. The sheet thus obtained was heated again to a was then cooled over a cooling roll to a temperature of about 60° C. to obtain a laminated film.

The laminated film thus obtained was heated again to a temperature of 145° C., longitudinally oriented by a factor of 5 utilizing the difference in peripheral speed between a multitude of rolls, heated again to a temperature of about 150° C., and then crosswise oriented by a factor of 8.5 using a tenter. Thereafter, the laminated film was annealed at a temperature of 160° C., cooled to a temperature of 60° C., and then slit at the edge thereof to obtain a three-layer (biaxially oriented layer/biaxially oriented layer/biaxially oriented layer) laminated thermoplastic resin film having a thickness of 100 μm (A2/A1/A3=3 μm/94 μm/3 μm), a whiteness degree of 96% an opacity of 90%, a porosity of 40% and a density of 0.66 g/cm³.

Preparation Example 3

The procedure of Preparation Example 1 was followed to obtain a three-layer (monoaxially oriented layer/biaxially oriented layer/monoaxially oriented layer) laminated thermoplastic resin film having a thickness of 130 μm (A2/A1/A3=25 μm/80 μm/25 μm), a whiteness degree of 96%, an opacity of 92%, a porosity of 30% and a density of 0.77 g/cm³.

{II} Preparation of IC Circuit Protective Layer (C)

Preparation Example 4

The procedure of Preparation Example 1 was followed except that the lip opening of die and the extruded amount of compositions were properly adjusted to obtain a laminated thermoplastic resin film having a thickness of 300 μm (A2/A1/A2=60 μm/180 μm/60 μm), a whiteness degree of 96%, an opacity of 99%, a porosity of 36% and a density of 0.78 g/cm³.

Preparation Example 5

A composition A2 obtained by blending 97% by weight of a propylene homopolymer b with 3% by weight of calcium carbonate and a composition obtained by blending 98% by weight of a propylene homopolymer c with 2% by weight of titanium dioxide were melt-kneaded at a temperature of 220° C. in separate extruders, supplied into a die where they were laminated ((A2)/(A1)/(A2)) and then extruded into a white three-layer [(a2)/(a1)/(a2')] unoriented laminated resin film (a) (thickness: 60 μm/160 μm/60 μm).

On the thermoplastic resin film obtained in Preparation Example 1 was then thermally laminated the unoriented laminated film (a) thus extruded from die while the unoriented laminated film (a) was kept softened to obtain a composite laminated resin film (thickness: 400 μm) of thermoplastic resin film (thickness: 60 μm)/unoriented laminated resin film (a) (thickness: 280 μm)/thermoplastic resin film (thickness: 60 μm). The composite laminated resin film exhibited a whiteness degree of 94%, an opacity of 90%, a porosity of 11% and a density of 0.86 g/cm³.

Preparation Example 6

The procedure of Preparation Example 5 was followed except that the lip opening of die and the extruded amount of compositions were properly adjusted to obtain a white unoriented three-layer [(a2)/(a1)/(a2')] laminated film (thickness: 60 μm/280 μm/60 μm). The unbonded laminate having a thickness of 400 μm exhibited a whiteness degree of 25%, an opacity of 25%, a porosity of 0% and a density of 0.92 g/cm³.

{III} Preparation of IC Circuit Layer (B)

Preparation Example 7

An electrolytic copper foil having a thickness of 35 μm was bonded to one side of a polyimide film having a thickness of 50 μm with a bonding sheet. The electrolytic copper foil was then etched to form an antenna circuit thereon. The copper foil was polished on the surface thereof, washed with water, and then dried. An IC circuit (thickness: 200 μm) was then mounted on the antenna surface of the copper foil, and then packaged by an epoxy resin at the surface thereof to obtain an IC circuit layer (B) (thickness: 300 μm).

Preparation Example 8

An isocyanate solvent-based silver paste was silk screen-printed on one surface of a polyester film having a thickness of 125 μm as an antenna circuit. The printed antenna circuit was dried with hot air, allowed to stand in a 80° C. constant temperature bath for 3 hours, and then withdrawn.

Thereafter, an IC circuit (thickness: 200 μm) was mounted on the antenna circuit and then packaged by an epoxy resin at the surface thereof to obtain an IC circuit layer (B) (thickness: 375 μm).

EXAMPLE 1

The thermoplastic resin film obtained in Preparation Example 1 was used as the thermoplastic resin film layer (A) and the thermoplastic resin film layer (A'). A solvent-based coating compound comprising an acrylurethane resin and calcium carbonate was applied to the surface of the thermoplastic resin film layer (A) and the thermoplastic resin film layer (A') by means of a gravure coater in a dry coated amount of 1 g/m² to form a print layer thereon. Letter and image data were then gravure-printed on the print layer. Black solid printing (thickness: 2 μm) was effected on the laminate on the side thereof opposite the print layer to a black density of 1.65 to form a light shielding layer (E).

A polyester-based anchor coating agent (AD-503, produced by Toyo-Morton, Ltd.) was applied to the light shielding layer (E) of the thermoplastic resin film layer (A) and the thermoplastic resin film layer (A') as an adhesive layer (D) in an amount of 4 g/m² (as calculated in terms of solid content). The thermoplastic resin film layer (A') and the thermoplastic resin film layer (A) were then simultaneously contact-bonded to the IC circuit layer (B) (obtained in Preparation Example 8) side thereof and the other side thereof, respectively, to obtain an IC tag having a print layer/A/E/D/B/D/E/A'/print layer structure.

Referring to the physical properties, the IC tag thus obtained had a thickness of 510 μm and a whiteness degree of 90%.

Measurement of Total Light Transmittance

Using a type U-3310 spectrophotometer (produced by Hitachi, Ltd.), the IC tag was measured for total light transmittance (according to JIS K-7105) at a wavelength of from 380 to 780 nm.

The total light transmittance of the IC tag was 5.5%.

Visibility of Printed Surface

The visibility of the IC tag having a print layer as viewed on the thermoplastic resin film layer (A) side thereof was evaluated according to the following criterion. The results are set forth in Table 2 with the foregoing physical properties.

G (good): Letter and image data recorded on the surface of the IC tag can be recognized clear. Further, the inner IC circuit layer (B) cannot be seen through.

F (fair): Letter and image data recorded on the surface of the IC tag are recognized blurred or the inner IC circuit layer (B) can be seen through.

P (poor): Letter and image data recorded on the surface of the IC tag are recognized blurred and the inner IC circuit layer (B) can be seen through.

EXAMPLE 2

The thermoplastic resin film obtained in Preparation Example 1 was used as the thermoplastic resin film layer (A) and the thermoplastic resin film layer (A'), so as to prepare the same print layer as in Example 1. Separately, a transparent polyethylene terephthalate (PET) film having a thickness of 23 μm (trade name: Lumirror #25) produced by Toray Industries, Inc. was used as a thermoplastic resin film layer (F). A polyurethane anchor coating agent (EL-150, produced by Toyo-Morton, Ltd.) was applied to one surface of the thermoplastic resin film layer (F) in a dry coated amount of 1 g/m$^2$, half-dried, and then provided with an aluminum vacuum-deposited layer having a thickness of 100 nm to form a light shielding layer (E) thereon. A polyester-based anchor coating agent (AD-503, produced by Toyo-Morton, Ltd.) was used as an adhesive layer (D) in an amount of 4 g/m$^2$ (as calculated in terms of solid content). Thus, an IC tag having a print layer/A/D/E/F/D/B/D/F/E/D/A'/print layer structure was obtained. Referring to the physical properties the IC tag thus obtained exhibited a thickness of 560 μm, a whiteness degree of 92% and a total light transmittance of 5.5%. The results of the evaluation of visibility of the IC tag thus obtained are set forth in Table 2 with the foregoing physical properties.

EXAMPLE 3

The procedure of Example 1 was followed except that the thermoplastic resin film layer (A) and the thermoplastic resin film (A') each was replaced by the film having a thickness of 100 μm obtained by Preparation Example 2, to prepare an IC tag having a print layer/A/E/D/B/D/E/A'/print layer structure. Referring to the physical properties, the IC tag thus obtained exhibited a thickness of 590 μm, a whiteness degree of 94% and a total light transmittance of 5.5%. The results of the evaluation of visibility of the IC tag thus obtained are set forth in Table 2 with the foregoing physical properties.

EXAMPLE 4

The procedure of Example 1 was followed except that the thermoplastic resin film layer (A) and the thermoplastic resin film (A') each was replaced by the film having a thickness of 130 μm obtained by Preparation Example 3. Further, a urethane-based two-pack hardening adhesive containing titanium oxide whisker in an amount of 30% by weight was applied by means of a comma coater to form an adhesive layer (D) containing a light shielding layer (E) in a dry coated amount of 100 g/m$^2$ by means of a comma coater, to prepare an IC tag having a print layer/A/D+E/B/D+E/A'/print layer structure. Referring to the physical properties, the IC tag thus obtained exhibited a thickness of 790 μm, a whiteness degree of 88% and a total light transmittance of 8.5%. The results of the evaluation of visibility of the IC tag thus obtained are set forth in Table 2 with the foregoing physical properties.

Comparative Example 1

The procedure of Example 4 was followed except that as the thermoplastic resin film layer (A) there was used the film having a thickness of 60 μm of Preparation Example 1 and the adhesive layer (D) was free of titanium oxide whisker to prepare an IC tag having a print layer/A/D/B/D/A'/print layer structure. Referring to the physical properties, the IC tag thus obtained exhibited a thickness of 835 μm, a whiteness degree of 88% and a total light transmittance of 16.5%.

EXAMPLE 5

The thermoplastic resin film obtained in Preparation Example 1 was used as the thermoplastic resin film layer (A) and the thermoplastic resin film layer (A'). A solvent-based coating compound comprising an acrylurethane resin and calcium carbonate was applied to the surface of the thermoplastic resin film layer (A) obtained in Preparation Example 1 by means of a gravure coater in a dry coated amount of 1 g/m$^2$ to form a print layer thereon. Letter and image data were then gravure-printed on the print layer. Black solid gravure printing (thickness: 2 μm) was effected on the laminate on the side thereof opposite the print layer to a black density of 1.65 to form a light shielding layer (E).

A polyester-based anchor coating agent (AD-503, produced by Toyo-Morton, Ltd.) was applied to the light shielding layer (E) of the thermoplastic resin film layer (A) and the thermoplastic resin film layer (A') as an adhesive layer (D) in an amount of 4 g/m$^2$ (as calculated in terms of solid content). The thermoplastic resin film layer (A') and the thermoplastic resin film layer (A) were then simultaneously contact-bonded to the thermoplastic resin film layer (F) on the IC circuit layer (B) (obtained in Preparation Example 8) side thereof and the other side thereof, respectively.

Subsequently, a solvent-based acrylic adhesive was applied to the silicon-treated surface of a release paper comprising a glassine paper as a base material in a dry coated amount of 8 g/m$^2$ by means of a comma coater, and then dried to form an adhesive layer (G).

Next the foregoing adhesive layer (G) was then contact-bonded to the thermoplastic resin film layer (A') on the side thereof opposite the IC circuit layer (B) to obtain an IC label with release paper having a print layer/A/D/E/F/D/B/D/A'/G/release paper structure.

The IC label with release paper thus obtained is freed of release paper before use.

Referring to the physical properties developed after removal of release paper, the IC label had a thickness of 510 μm, a whiteness degree of 90% and a total light transmittance of 6.0%.

EXAMPLE 6

The thermoplastic resin film obtained in Preparation Example 1 was used as the thermoplastic resin film layer (A) and the thermoplastic resin film layer (A'), so as to prepare the same print layer as in Example 5. Separately, a transparent polyethylene terephthalate (PET) film having a thickness of 23 μm (trade name: Lumirror #25) produced by Toray industries, Inc. was used as a thermoplastic resin film layer (F). A polyurethane anchor coating agent (FL-150, produced by Toyo-Morton, Ltd.) was applied to one surface of the thermoplastic resin film layer (F) in a dry coated amount of 1 g/m$^2$, half-dried, and then provided with an aluminum vacuum-deposited layer having a thickness of 100 nm to form a light shielding layer (E) thereon. A polyester-based anchor coating agent (AD-503, produced by Toyo-Morton, Ltd.) was used as an adhesive layer (D) in an amount of 4 g/m$^2$ (as calculated in terms of solid content).

An adhesive layer (G) was prepared in the same manner as in Example 5.

An IC label with release paper having a print layer/A/D/E/F/D/B/D/A'/G/release paper structure was obtained in the same manner as in Example 5. Referring to the physical properties developed after removal of release paper, the IC label had a thickness of 540 μm, a whiteness degree of 92% and a total light transmittance of 6.0%.

EXAMPLE 7

The procedure of Example 5 was followed except that the thermoplastic resin film (A) and the thermoplastic resin film (A') were replaced by the film having a thickness of 100 μm obtained in Preparation Example 2 to prepare an IC label with release paper having a printing layer/A/E/D/B/D/A'/G/release paper structure.

Referring to the physical properties developed after removal of release paper, the IC label had a thickness of 590 μm, a whiteness degree of 94% and a total light transmittance of 6.0%.

EXAMPLE 8

The procedure of Example 7 was followed except that the thermoplastic resin film (A') was excluded to prepare an IC label with release paper having a printing layer/A/E/D/B/G/release paper structure.

Referring to the physical properties developed after removal of release paper, the IC label had a thickness of 490 μm, a whiteness degree of 92% and a total light transmittance of 6.5%.

The release paper was peeled off the IC label. Two sheets of such IC labels were then laminated on each other on the adhesive layer side thereof to obtain an airline tag.

EXAMPLE 9

A print layer and a light shielding layer (E) were prepared in the same manner as in Example 1. Next the IC circuit of the IC circuit layer (B) of Preparation Example 7 and the antenna circuit portion were punched to form a 35 mm square. Separately, the IC circuit protective layer (C) obtained in Preparation Example 4 was punched to form a 36 mm square hole therein.

A polyester anchor coating agent was then applied to the light shielding layer (E) of the thermoplastic resin film layer (A) as an adhesive layer (D) in an amount of 4 g/m² (as calculated in terms of solid content). The thermoplastic resin film (A) was then contact-bonded to one surface of the IC circuit protective layer (C) thus punched.

Subsequently, the IC circuit layer (B) was inserted into the hole punched in the IC circuit protective layer (C) laminated on the thermoplastic resin film layer (A) on the side thereof opposite the thermoplastic resin film layer (A). The thermoplastic resin film layer (A') having the light shielding layer (E) provided thereon was then contact-bonded to the laminate with the adhesive layer (D) interposed therebetween. The laminate was punched into a size of 55 mm×85 mm. Using a card printing machine, letter and image data were then offset-printed on the print layer to obtain an IC tag having a print layer/A/E/D/B+C/D/E/A'/print layer structure.

Referring to the physical properties, the IC tag thus obtained exhibited a thickness of 435 μm, a whiteness degree of 90% and a total light transmittance of 5.5%.

EXAMPLE 10

The procedure of Example 9 was followed except that the thermoplastic resin film (A) and the thermoplastic resin film (A') were replaced by the film having a thickness of 100 μm obtained in Preparation Example 2 to prepare an IC tag having a print layer/A/E/D/B+C/D/E/A'/print layer structure. Referring to the physical properties, the IC tag thus obtained had a thickness of 515 μm, a whiteness degree of 94% and a total light transmittance of 5.5%.

The results of the evaluation of physical properties of the tag thus prepared are set forth in Table 3.

EXAMPLE 11

The procedure of Example 9 was followed except that the IC circuit protective layer (C) was replaced by the composite laminated resin film having a thickness of 400 μm obtained in Preparation Example 5 and the IC circuit layer (B) was replaced by the polyester film base obtained in Preparation Example 8 to prepare an IC tag having a print layer/A/E/D/B+C/D/E/A'/print layer structure. Referring to the physical properties, the IC tag thus obtained had a thickness of 535 μm, a whiteness degree of 90% and a total light transmittance of 5.5%.

The results of the evaluation of physical properties of the tag thus prepared are set forth in Table 3.

EXAMPLE 12

The procedure of Example 11 was followed except that the IC circuit protective layer (C) was replaced by the unoriented laminated resin film having a thickness of 400 μm obtained in Preparation Example 6 to prepare an IC tag having a print layer/A/E/D/B+C/D/E/A'/print layer structure. Referring to the physical properties, the IC tag thus obtained bad a thickness of 535 μm, a whiteness degree of 90% and a total light transmittance of 5.5%.

The results of the evaluation of physical properties of the tag thus prepared are set forth in Table 3.

EXAMPLE 13

The procedure of Example 12 was followed except that a urethane-based two-pack hardening adhesive comprising titanium oxide whisker incorporated in the material of the adhesive layer (D) in an amount of 30% by weight was applied as a light shielding layer (F) in a dry coated amount of 50 g/m², so as to prepare an IC tag having a print layer/A/E+D/B+C/E+D/A'/print layer structure. Referring to the physical properties, the IC tag thus obtained had a thickness of 600 μm, a whiteness degree of 90% and a total light transmittance of 9.0%.

The results of the evaluation of physical properties of the tag thus prepared are set forth in Table 3.

Comparative Example 2

The procedure of Example 13 was followed except that the adhesive layer (D) was free of titanium oxide, whisker to prepare an IC tag having a print layer/A/D/B+C/D/A'/print layer structure. Referring to the physical properties, the IC tag thus obtained had a thickness of 620 μm, a whiteness degree of 94% and a total light transmittance of 16.8%.

The results of the evaluation of physical properties of the tag thus prepared are set forth in Table 3.

EXAMPLE 14

A solvent-based coating compound comprising an acrylurethane resin and calcium carbonate was applied to the surface of the thermoplastic resin film layer (A) obtained in Preparation Example 1 by means of a gravure coater in a dry coated amount of 1 g/m² to form a print layer thereon.

Separately, a polyethylene terephthalate film (PET) having a thickness of 23 μm (trade name: Lumirror #25) produced by Toray industries Inc. was used as a thermoplastic resin film layer (F) and thermoplastic resin film layer (A'). Black solid gravure printing (thickness: 2 μm) was effected on the both surfaces of the thermoplastic resin film layer (F) and (A') to a black density of 1.65 to form a light shielding layer (E).

Separately, the IC circuit protective layer (C) obtained in Preparation Example 4 was punched to form a 36 mm square hole therein.

Subsequently, a polyester anchor coating agent was applied to the light shielding layer (E) of the thermoplastic resin film layer (F) and (A') as an adhesive layer (D) in an amount of 4 g/m² (as calculated in terms of solid content). The thermoplastic resin film layer (F) was then contact-bonded to one surface of the punched IC circuit protective layer (C) obtained in Preparation Example 4 to obtain an A/D/E/F/E/D/C structure.

Subsequently, the IC circuit layer (B) obtained in Preparation Example 7 was punched into a square (35 mm×35 mm), and the IC circuit layer (B) of Preparation Example 7 was inserted into the hole punched in the IC, circuit protective layer (C) on the side thereof opposite the thermoplastic resin film layer (A). The adhesive layer (D) of the thermoplastic resin film layer (A') having the light shielding layer (E) and the adhesive layer (D) provided thereon was then contact-bonded to the laminate to obtain an A/D/E/F/E/D/B+C/D/E/A'/E structure.

Subsequently, a solvent-based acrylic adhesive was applied to the silicon-treated surface of a release paper comprising a glassine paper as a base material in a dry coated amount of 20 g/m² by means of a comma coater, and then dried to form an adhesive layer (G). The foregoing adhesive layer (G) was then contact-bonded to the thermoplastic resin film layer (A') on the side thereof opposite the IC circuit layer (B).

Subsequently, the laminate was punched into a size of 55 mm×85 mm. Using a card printing machine, letter and image data were then offset-printed on the print layer to obtain an IC label with release paper having a print layer/A/D/E/F/E/D/B+C/D/E/A'/E/G/release paper structure.

The non-contact IC label with release paper thus obtained is freed of release paper before use.

The IC label thus obtained had a thickness of 445 μm, a whiteness degree of 90% and a total light transmittance of 5.0%.

EXAMPLE 15

The procedure of Example 14 was followed except that the thermoplastic resin film layer (A) was replaced by the film having a thickness of 100 μm obtained in Preparation Example 2 to prepare an IC label having a print layer/A/D/E/F/E/D/B+C/D/E/A'/E/G/release paper structure. The release paper was then peeled off from the IC label. The IC label was then evaluated for various physical properties and visibility.

The results of evaluation are set forth in Table 3.

EXAMPLE 16

The procedure of Example 14 was followed except that the IC circuit protective layer (C) was replaced by the unoriented laminated resin film having a thickness of 400 μm obtained in Preparation Example 5 and the IC circuit layer (B) was replaced by the polyester film base obtained in Preparation Example 8 to prepare an IC tag having a print layer/A/D/E/F/E/D/B+C/D/E/A'/G/release paper structure. The release paper was then peeled off from the IC label. The IC label was then evaluated for various physical properties and visibility.

The results of evaluation are set forth in Table 3.

EXAMPLE 17

The procedure of Example 16 was followed except that the IC circuit protective layer (C) was replaced by the unoriented laminated resin film having a thickness of 400 μm obtained in Preparation Example 6 to prepare an IC label having a print layer/A/D/E/F/E/D/B+C/D/E/A'/E/G/release paper structure. The release paper was then peeled off from the IC label. The IC label was then evaluated for various physical properties and visibility.

The results of evaluation are set forth in Table 3.

EXAMPLE 18

The procedure of Example 17 was followed except that the thermoplastic resin film layers (F) and (A') were not used and a urethane-based two-pack hardening adhesive comprising titanium oxide whisker incorporated in the material of the adhesive layer (D) in an amount of 30% by weight was applied to one surface of the thermoplastic resin film layer (A) as a light shielding layer (E) in a dry coated amount of 50 g/m² by means of a comma coater, and the coated thermoplastic resin film layer (A) was then contact-bonded to and laminated on the both surfaces of the IC circuit layer (B) while being in half-dried state. After allowed to stand for 8 hours, hardening and bonding were completed to prepare an IC tag having a print layer/A/E+D/B+C/G/release paper structure. The release paper was then peeled off from the IC label. The IC label was then evaluated for various physical properties and visibility.

The results of evaluation are set forth in Table 3.

The release paper was peeled off the IC label. Two sheets of such IC labels were then laminated on each other on the adhesive layer side thereof to obtain an airline tag.

EXAMPLE 19

The procedure of Example 18 was followed except that the adhesive layer (D) was free of titanium oxide whisker and black solid gravure printing (thickness: 2 μm) was effected on the thermoplastic resin film layer (A) on the side thereof opposite the print layer to a black density of 1.65 to form a light shielding layer (E). Thus, an IC label having a print layer/A/E/D/B+C/G/release paper structure was obtained.

The release paper was then peeled off from the IC label. The IC label was then evaluated for various physical properties and visibility.

The results of evaluation are set forth in Table 3.

The release paper was peeled off the IC label. Two sheets of such IC labels were then laminated on each other on the adhesive layer side thereof to obtain an airline tag

Comparative Example 3

The procedure of Example 18 was followed except that the adhesive layer (D) was free of titanium oxide whisker to prepare an IC label having a print layer/A/D/B+C/G/release paper structure. The release paper was then peeled off from the IC label. The IC label was then evaluated for various physical properties and visibility.

The results of evaluation are set forth in Table 3.

TABLE 2-1

| | | Preparation example of Layer (A) | Preparation example of Layer (B) | Light shielding layer (E) | Layer (F) | Layer (A') | Constitution | Thickness (μm) |
|---|---|---|---|---|---|---|---|---|
| Example Nos. | 1 | Preparation Example 1 | Preparation Example 8 | Provided | None | Preparation Example 1 | A/E/D/B/D/E/A' | 510 |
| | 2 | Preparation Example 1 | Preparation Example 8 | Provided | PET | Preparation Example 1 | A/D/E/F/D/B/D/F/E/D/A' | 560 |
| | 3 | Preparation Example 2 | Preparation Example 8 | Provided | None | Preparation Example 2 | A/E/D/B/D/E/A' | 590 |
| | 4 | Preparation Example 3 | Preparation Example 8 | Provided | None | Preparation Example 3 | A/E + D/B/E + D/A' | 790 |
| | 5 | Preparation Example 1 | Preparation Example 8 | Provided | None | Preparation Example 1 | A/E/D/B/D/A'/G | 510 |
| | 6 | Preparation Example 1 | Preparation Example 8 | Provided | PET | Preparation Example 1 | A/D/E/F/D/B/D/A'/G | 540 |
| | 7 | Preparation Example 2 | Preparation Example 8 | Provided | None | Preparation Example 2 | A/E/D/B/D/A'/G | 590 |
| | 8 | Preparation Example 2 | Preparation Example 8 | Provided | None | None | A/E/D/B/G | 490 |
| Comparative Example Nos. | 1 | Preparation Example 3 | Preparation Example 8 | Not provided | None | Preparation Example 3 | A/D/B/D/A' | 835 |

TABLE 2-2

| | | % Whiteness degree | Total light transmittance | Evaluation/ visibility |
|---|---|---|---|---|
| Example Nos. | 1 | 90 | 5.5 | G |
| | 2 | 92 | 5.5 | G |
| | 3 | 94 | 5.5 | G |
| | 4 | 88 | 8.5 | G |
| | 5 | 90 | 6.0 | G |
| | 6 | 92 | 6.0 | G |
| | 7 | 94 | 6.0 | G |
| | 8 | 92 | 6.5 | G |
| Comparative Example Nos. | 1 | 88 | 16.5 | F |

TABLE 3-1

| | | Preparation example of Layer (A) | Preparation example of Layer (B) | Preparation example of Layer (C) | Light shielding layer (E) | Layer (F) | Layer (A') | Constitution | Thickness (μm) |
|---|---|---|---|---|---|---|---|---|---|
| Example Nos. | 9 | Preparation Example 1 | Preparation Example 7 | Preparation Example 4 | Provided | None | Preparation Example 1 | A/E/D/B + C/D/E/A' | 435 |
| | 10 | Preparation Example 2 | Preparation Example 7 | Preparation Example 4 | Provided | None | Preparation Example 2 | A/E/D/B + C/D/E/A' | 515 |
| | 11 | Preparation Example 1 | Preparation Example 8 | Preparation Example 5 | Provided | None | Preparation Example 1 | A/E/D/B + C/D/E/A' | 535 |
| | 12 | Preparation Example 1 | Preparation Example 8 | Preparation Example 6 | Provided | None | Preparation Example 1 | A/E/D/B + C/D/E/A' | 535 |
| | 13 | Preparation Example 1 | Preparation Example 8 | Preparation Example 6 | Provided | None | Preparation Example 1 | A/E + D/B + C/E + D/A' | 600 |
| | 14 | Preparation Example 1 | Preparation Example 7 | Preparation Example 4 | Provided | PET | PET | A/D/E/F/E/D/B + C/D/E/A'/E/G | 445 |
| | 15 | Preparation Example 2 | Preparation Example 7 | Preparation Example 4 | Provided | PET | PET | A/D/E/F/E/D/B + C/D/E/A'/E/G | 485 |
| | 16 | Preparation Example 1 | Preparation Example 8 | Preparation Example 5 | Provided | PET | PET | A/D/E/F/E/D/B + C/D/E/A'/E/G | 545 |
| | 17 | Preparation Example 1 | Preparation Example 8 | Preparation Example 6 | Provided | PET | PET | A/D/E/F/E/D/B + C/D/E/A'/E/G | 545 |
| | 18 | Preparation Example 1 | Preparation Example 8 | Preparation Example 6 | Provided | None | None | A/E + D/B + C/G | 520 |
| | 19 | Preparation Example 1 | Preparation Example 8 | Preparation Example 6 | Provided | None | None | A/E/D/B + C/G | 490 |
| Comparative Example | 3 | Preparation Example 1 | Preparation Example 8 | Preparation Example 6 | Not provided | None | Preparation Example 1 | A/D/B + C/D/A' | 620 |

TABLE 3-1-continued

| | | Preparation example of Layer (A) | Preparation example of Layer (B) | Preparation example of Layer (C) | Light shielding layer (E) | Layer (F) | Layer (A') | Constitution | Thickness (μm) |
|---|---|---|---|---|---|---|---|---|---|
| Nos. | 4 | Preparation Example 1 | Preparation Example 8 | Preparation Example 6 | Not provided | None | None | A/D/B + C/G | 530 |

TABLE 3-2

| | | % Whiteness degree | Total light transmittance | Evaluation/ visibility |
|---|---|---|---|---|
| Example Nos. | 9 | 90 | 5.5 | G |
| | 10 | 94 | 5.5 | G |
| | 11 | 90 | 5.5 | G |
| | 12 | 90 | 5.5 | G |
| | 13 | 90 | 9.0 | G |
| | 14 | 90 | 5.0 | G |
| | 15 | 94 | 5.0 | G |
| | 16 | 90 | 5.0 | G |
| | 17 | 90 | 5.0 | G |
| | 18 | 90 | 9.0 | G |
| | 19 | 90 | 6.4 | G |
| Comparative Example Nos. | 2 | 94 | 16.8 | F |
| | 3 | 94 | 16.8 | F |

The present invention provides an IC tag and label which allow data to be recorded on the thereof, are free from security problem that the inner IC circuit or wiring circuit can be seen through, exhibit excellent strength and water resistance, can be used even in the atmosphere and water and can be used for frozen food vessels, industrial products, various chemical vessels, etc. and for flow control, production line control, etc.

The present invention is based on Japanese Patent application No. 2000-268206, filed on Sep. 5, 2000, Japanese Patent Application No. 2000-281880, filed on Sep. 18, 2000, Japanese Patent application No. 2000-368110, filed on Dec. 4, 2,000, and Japanese Patent Application No. 2000-389052, filed on Dec. 21, 2000, the disclosures of which are incorporated [herein as] by reference herein in their entireties.

While the invention has been described in detail and with reference to specific embodiments thereof, it will be apparent to one skilled in the art that various changes and modifications can be made therein without departing from the spirit and scope thereof.

What is claimed is:

1. A tag comprising
   an IC circuit layer (B),
   a thermoplastic resin film layer (A),
   a light shielding layer (E), and
   an adhesive layer (D) between the IC circuit layer (B) and the thermoplastic resin film layer (A),
   wherein the tag has a total light transmittance of not greater than 15% and the opacity of the thermoplastic resin layer (A) is 80% or greater.

2. The tag according to claim 1, further comprising
   an other thermoplastic resin film layer (A), and
   an other adhesive layer (D), wherein
      the other adhesive layer (D) is between the IC circuit layer (B) and the other thermoplastic resin film layer (A).

3. The tag according to claim 1, further comprising
   an IC circuit protective layer (C) containing a hole, wherein
      the IC circuit layer (B) is inside the hole.

4. The tag according to claim 1, wherein the light shielding layer (E) is on at least one side of the IC circuit layer (B).

5. The tag according to claim 1, further comprising
   a thermoplastic resin film layer (F),
   wherein the thermoplastic film layer (F) and the adhesive layer (D) are between the light shielding layer (E) and the IC circuit layer (B).

6. The tag according to claim 1, which exhibits a whiteness degree of not smaller than 85%.

7. The tag according to claim 1, wherein the light shielding layer (E) is interposed between the thermoplastic film resin layer (A) and the IC circuit layer (B).

8. The tag according to claim 1, wherein the thermoplastic resin film (A) exhibits an opacity of not smaller than 80% and a whiteness degree of not smaller than 90%.

9. The tag according to claim 1, wherein the thermoplastic resin film layer (A) exhibits a porosity of from 10 to 60% as calculated by the following equation:

$$\% \text{ Porosity} = \{(\rho_0 - \rho)/\rho_0\} \times 100 \quad (1)$$

where $\rho_0$ represents the true density of the film; and $\rho$ represents the density of the film.

10. The tag according to claim 1, wherein the thermoplastic resin film layer (A) comprises a thermoplastic resin selected from the group consisting of a polyolefin resin and a polyester resin.

11. The tag according to claim 10, wherein
   the thermoplastic resin is the polyolefin resin; and
   the polyolefin resin comprises a propylene resin.

12. The tag according to claim 1, further comprising a recording layer (H) on the thermoplastic resin film layer (A).

13. The tag according to claim 1, further comprising
   an IC circuit protective layer (C) containing a hole, wherein
      the IC circuit layer (B) is inside the hole; and
      the IC circuit layer (B) is not thicker than the IC circuit protective layer (C).

14. The tag according to claim 13, wherein the light shielding layer (E) is on at least one side of the IC circuit protective layer (C).

15. The tag according to claim 13, which exhibits a whiteness degree of not smaller than 85%.

16. The tag according to claim 13, wherein the thermoplastic resin film (A) exhibits an opacity of not smaller than 80% and a whiteness degree of not smaller than 90%.

17. The tag according to claim 13, wherein the thermoplastic resin film layer (A) exhibits a porosity of from 10 to 60% as calculated by the following equation:

$$\% \text{ Porosity} = \{(\rho_0 - \rho)/\rho_0\} \times 100 \quad (1)$$

where $\rho_0$ represents the true density of the film; and $\rho$ represents the density of the film.

18. The tag according to claim 13, wherein the thermoplastic resin film layer (A) comprises a thermoplastic resin selected from the group consisting of a polyolefin resin and a polyester resin.

19. The tag according to claim 18, wherein
the thermoplastic resin is the polyolefin resin; and
the polyolefin resin comprises a propylene resin.

20. The tag according to claim 13, further comprising a recording layer (H) on the thermoplastic resin film layer (A).

21. A label comprising an adhesive layer (G) laminated on one side of the tag according to claim 13.

22. An airline tag comprising a label as defined in claim 21.

23. A label comprising an adhesive layer (G) laminated on one side of the tag according to claim 1.

24. An airline tag comprising a label as defined in claim 23.

25. A method of making the label of claim 23, method comprising laminating an adhesive layer (G) on a tag.

26. A method of making a tag, the method comprising
laminating an IC circuit layer (B), a thermoplastic layer (A) and an adhesive layer D; and
producing the tag of claim 1.

* * * * *